(12) United States Patent
Liu et al.

(10) Patent No.: US 10,805,629 B2
(45) Date of Patent: Oct. 13, 2020

(54) VIDEO COMPRESSION THROUGH MOTION WARPING USING LEARNING-BASED MOTION SEGMENTATION

(71) Applicant: GOOGLE LLC, Mountain View, CA (US)

(72) Inventors: Yuxin Liu, Palo Alto, CA (US); Adrian Grange, Los Gatos, CA (US)

(73) Assignee: GOOGLE LLC, Mountain View, CA (US)

( * ) Notice: Subject to any disclaimer, the term of this patent is extended or adjusted under 35 U.S.C. 154(b) by 266 days.

(21) Appl. No.: 15/898,532

(22) Filed: Feb. 17, 2018

(65) Prior Publication Data
US 2019/0261016 A1    Aug. 22, 2019

(51) Int. Cl.
*H04N 19/527* (2014.01)
*H04N 19/172* (2014.01)
(Continued)

(52) U.S. Cl.
CPC ......... *H04N 19/527* (2014.11); *G06K 9/4628* (2013.01); *G06K 9/6274* (2013.01);
(Continued)

(58) Field of Classification Search
CPC .. H04N 19/527; H04N 19/503; H04N 19/593; H04N 19/17; H04N 19/167;
(Continued)

(56) References Cited

U.S. PATENT DOCUMENTS

| 6,073,253 A | 6/2000 | Nordstrom et al. |
| 6,909,810 B2 * | 6/2005 | Maeda ................ H04N 19/196 |
| | | 375/E7.042 |

(Continued)

FOREIGN PATENT DOCUMENTS

| CN | 103873861 A | 6/2014 |
| CN | 104966093 A | 10/2015 |

OTHER PUBLICATIONS

Gupta et al. "Parametric Coding of Texture in Multi-view Videos for 3DTV", 2015 Eighth International Conference on Advances in Pattern Recognition (ICAPR), IEEE, 2015 (Year: 2015).*

(Continued)

*Primary Examiner* — Richard A Hansell, Jr.
(74) *Attorney, Agent, or Firm* — Young Basile Hanlon & MacFarlane, P.C.

(57) ABSTRACT

Regions for texture-based coding are identified using a spatial segmentation and a motion flow segmentation. For frames of a group of frames in a video sequence, a frame is segmented using a first classifier into at least one of a texture region or a non-texture region of an image in the frame. Then, the texture regions of the group of frames are segmented using a second classifier into a texture coding region or a non-texture coding region. The second classifier uses motion across the group of frames as input. Each of the classifiers is generated using a machine-learning process. Blocks of the non-texture region and the non-texture coding region of the current frame are coded using a block-based coding technique, while blocks of the texture coding region are coded using a coding technique that is other than the block-based coding technique.

19 Claims, 8 Drawing Sheets

(51) Int. Cl.

| | | |
|---|---|---|
| *H04N 19/176* | (2014.01) | |
| *H04N 19/61* | (2014.01) | |
| *G06T 7/11* | (2017.01) | |
| *G06N 3/08* | (2006.01) | |
| *G06T 7/238* | (2017.01) | |
| *H04N 19/503* | (2014.01) | |
| *H04N 19/593* | (2014.01) | |
| *H04N 19/17* | (2014.01) | |
| *H04N 19/167* | (2014.01) | |
| *G06T 7/194* | (2017.01) | |
| *H04N 19/103* | (2014.01) | |
| *G06K 9/46* | (2006.01) | |
| *G06K 9/62* | (2006.01) | |
| *G06T 7/40* | (2017.01) | |
| *H04N 19/543* | (2014.01) | |

(52) U.S. Cl.
CPC .................. *G06N 3/08* (2013.01); *G06T 7/11* (2017.01); *G06T 7/194* (2017.01); *G06T 7/238* (2017.01); *G06T 7/40* (2013.01); *H04N 19/103* (2014.11); *H04N 19/167* (2014.11); *H04N 19/17* (2014.11); *H04N 19/172* (2014.11); *H04N 19/176* (2014.11); *H04N 19/503* (2014.11); *H04N 19/543* (2014.11); *H04N 19/593* (2014.11); *H04N 19/61* (2014.11); *G06T 2207/10016* (2013.01); *G06T 2207/10024* (2013.01)

(58) Field of Classification Search
CPC .. H04N 19/103; H04N 19/543; H04N 19/172; H04N 19/176; H04N 19/61; G06T 7/238; G06T 7/194; G06T 7/40; G06T 7/11; G06T 2207/10024; G06T 2207/10016; G06K 9/4628; G06K 9/6274; G06N 3/08
See application file for complete search history.

(56) References Cited

U.S. PATENT DOCUMENTS

| | | | |
|---|---|---|---|
| 7,548,892 B2 | 6/2009 | Buck et al. | |
| 8,204,128 B2 | 6/2012 | Huchet et al. | |
| 2002/0051488 A1* | 5/2002 | Li | G06T 9/00 375/240 |
| 2006/0039617 A1* | 2/2006 | Makai | G06T 9/00 382/232 |
| 2012/0170659 A1* | 7/2012 | Chaudhury | H04N 19/20 375/240.16 |
| 2013/0142259 A1 | 6/2013 | Lim et al. | |
| 2013/0308849 A1* | 11/2013 | Fei | G06T 7/168 382/131 |
| 2015/0055855 A1* | 2/2015 | Rodriguez | G06K 9/6259 382/159 |
| 2016/0217552 A1* | 7/2016 | Yang | G06K 9/6218 |
| 2018/0330187 A1* | 11/2018 | Ouzounis | G06K 9/00637 |
| 2018/0342053 A1* | 11/2018 | Balagurusamy | G06T 7/11 |

OTHER PUBLICATIONS

Li et al. "Dual-Feature Warping-Based Motion Model Estimation", 2015 IEEE International Conference on Computer Vision (ICCV), Dec. 7-13, 2015, DOI: 10.1109/ICVV.2015.487 (Year: 2015).*
Richardson I.E. "The H.264 Advanced Video Compression Standard", Second Edition, 2010 (Year: 2010).*
International Search Report and Written Opinion in PCT/US2019/012643, dated Mar. 11, 2019, 19 pgs.
Bosch et al., "Segmentation-Based Video Compression Using Texture and Motion Models," IEEE Journal of Selected Topics in Signal Processing, vol. 5, No. 7, Nov. 2011, pp. 1366-1377.
Bankoski, et al., "Technical Overview of VP8, An Open Source Video Codec for the Web", Jul. 11, 2011, 6 pp.
Bankoski et al., "VP8 Data Format and Decoding Guide", Independent Submission RFC 6389, Nov. 2011, 305 pp.
Bankoski et al., "VP8 Data Format and Decoding Guide draft-bankoski-vp8-bitstream-02", Network Working Group, Internet-Draft, May 18, 2011, 288 pp.
Series H: Audiovisual and Multimedia Systems, Coding of moving video: Implementors Guide for H.264: Advanced video coding for generic audiovisual services, International Telecommunication Union, Jul. 30, 2010, 15 pp.
"Introduction to Video Coding Part 1: Transform Coding", Mozilla, Mar. 2012, 171 pp.
"Overview VP7 Data Format and Decoder", Version 1.5, On2 Technologies, Inc., Mar. 28, 2005, 65 pp.
Series H: Audiovisual and Multimedia Systems, Infrastructure of audiovisual services—Coding of moving video, Advanced video coding for generic audiovisual services, International Telecommunication Union, Version 11, Mar. 2009. 670 pp.
Series H: Audiovisual and Multimedia Systems, Infrastructure of audiovisual services—Coding of moving video, Advanced video coding for generic audiovisual services, International Telecommunication Union, Version 12, Mar. 2010, 676 pp.
Series H: Audiovisual and Multimedia Systems, Infrastructure of audiovisual services—Coding of moving video, Amendment 2: New profiles for professional applications, International Telecommunication Union, Apr. 2007, 75 pp.
Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp.
Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.
Series H: Audiovisual and Multimedia Systems, Infrastructure of audiovisual services—Coding of moving video, Advanced video coding for generic audiovisual services, Version 1, International Telecommunication Union, May 2003, 282 pp.
Series H: Audiovisual and Multimedia Systems, Infrastructure of audiovisual services—Coding of moving video, Advanced video coding for generic audiovisual services, Version 3, International Telecommunication Union, Mar. 2005, 343 pp.
"VP6 Bitstream and Decoder Specification", Version 1.02, On2 Technologies, Inc., Aug. 17, 2006, 88 pp.
"VP6 Bitstream and Decoder Specification", Version 1.03, On2 Technologies, Inc., Oct. 29, 2007, 95 pp.
"VP8 Data Format and Decoding Guide, WebM Project", Google On2, Dec. 1, 2010, 103 pp.

* cited by examiner

| TRAINING INSTANCE | BLOCK | LABEL |
|---|---|---|
| 1 | B1 | 0 |
| 2 | B2 | 1 |
| 3 | B3 | 1 |
| 4 | B4 | 1 |
| 5 | B5 | 0 |
| 6 | B6 | 0 |
| 7 | B7 | 0 |
| 8 | B8 | 1 |
| 9 | B9 | 0 |
| 10 | B10 | 0 |
| 11 | B11 | 0 |
| 12 | B12 | 0 |
| 13 | B13 | 2 |
| 14 | B14 | 2 |
| 15 | B15 | 2 |
| 16 | B16 | 2 |

VIDEO COMPRESSION THROUGH MOTION WARPING USING LEARNING-BASED MOTION SEGMENTATION

BACKGROUND

Digital video streams may represent video using a sequence of frames or still images. Digital video can be used for various applications including, for example, video conferencing, high definition video entertainment, video advertisements, or sharing of user-generated videos. A digital video stream can contain a large amount of data and consume a significant amount of computing or communication resources of a computing device for processing, transmission or storage of the video data. Various approaches have been proposed to reduce the amount of data in video streams, including compression and other encoding techniques.

One technique for compression uses a reference frame to generate a prediction block corresponding to a current block to be encoded. Differences between the prediction block and the current block can be encoded, instead of the values of the current block themselves, to reduce the amount of data encoded.

SUMMARY

This disclosure relates generally to encoding and decoding video data and more particularly relates to video compression using motion warping that is developed through learning-based motion segmentation.

This disclosure describes encoding and decoding methods and apparatuses. An apparatus according to an implementation of the disclosure includes a non-transitory storage medium or memory and a processor. The medium includes instructions executable by the processor to, for each frame of a group of frames in a video sequence, segment the frame using a first classifier into at least one of a texture region or a non-texture region of an image in the frame, the first classifier generated using a first machine-learning process, segment the texture regions of the group of frames using a second classifier into a texture coding region or a non-texture coding region, the second classifier using motion across the group of frames as input and generated using a second machine-learning process, and encode a current frame of the group of frames in the video sequence. Encoding the current frame comprises encoding blocks of the non-texture coding region of the current frame using a block-based coding technique and encoding blocks of the texture coding region of the current frame using other than the block-based coding technique.

Another apparatus according to an implementation of the disclosure also includes a non-transitory storage medium or memory and a processor. The medium includes instructions executable by the processor to select a current frame of a group of frames in a video sequence, the current frame encoded by, for each frame of a group of frames in a video sequence, segmenting the frame using a first classifier into at least one of a texture region or a non-texture region of an image in the frame, the first classifier generated using a first machine-learning process, segmenting a texture region of the group of frames using a second classifier into a texture coding region or a non-texture coding region, the second classifier using motion across the group of frames as input and generated using a second machine-learning process, upon a condition that the current frame has the non-texture region, encoding blocks of the non-texture region of the current frame using a block-based coding technique, encoding blocks of the non-texture coding region of the current frame using the block-based coding technique, and encoding blocks of the texture coding region of the current frame using other than the block-based coding technique. The instructions also include instructions to, upon the condition that the current frame has the non-texture region, decode the blocks of the non-texture region of the current frame using the block-based coding technique, decode the blocks of the non-texture coding region of the current frame using the block-based coding technique, and decode the blocks of the texture coding region using the other than the block-based coding technique.

A method according to an implementation of the disclosure includes selecting a current frame of a group of frames in a video sequence, the current frame encoded by, for each frame of a group of frames in a video sequence, segmenting the frame using a first classifier into at least one of a texture region or a non-texture region of an image in the frame, the first classifier generated using a first machine-learning process, segmenting the texture regions of the group of frames using a second classifier into a texture coding region or a non-texture coding region, the second classifier using motion across the group of frames as input and generated using a second machine-learning process, encoding blocks of the non-texture region of the current frame using a block-based coding technique, encoding blocks of the non-texture coding region of the current frame using the block-based coding technique, and encoding blocks of the texture coding region of the current frame using other than the block-based coding technique. The method also includes decoding the blocks of the texture coding region using the other than the block-based coding technique after decoding all other blocks of the current frame.

These and other aspects of the present disclosure are disclosed in the following detailed description of the embodiments, the appended claims, and the accompanying figures.

BRIEF DESCRIPTION OF THE DRAWINGS

The description herein makes reference to the accompanying drawings described below wherein like reference numerals refer to like parts throughout the several views unless otherwise noted.

DETAILED DESCRIPTION

Figure 1:
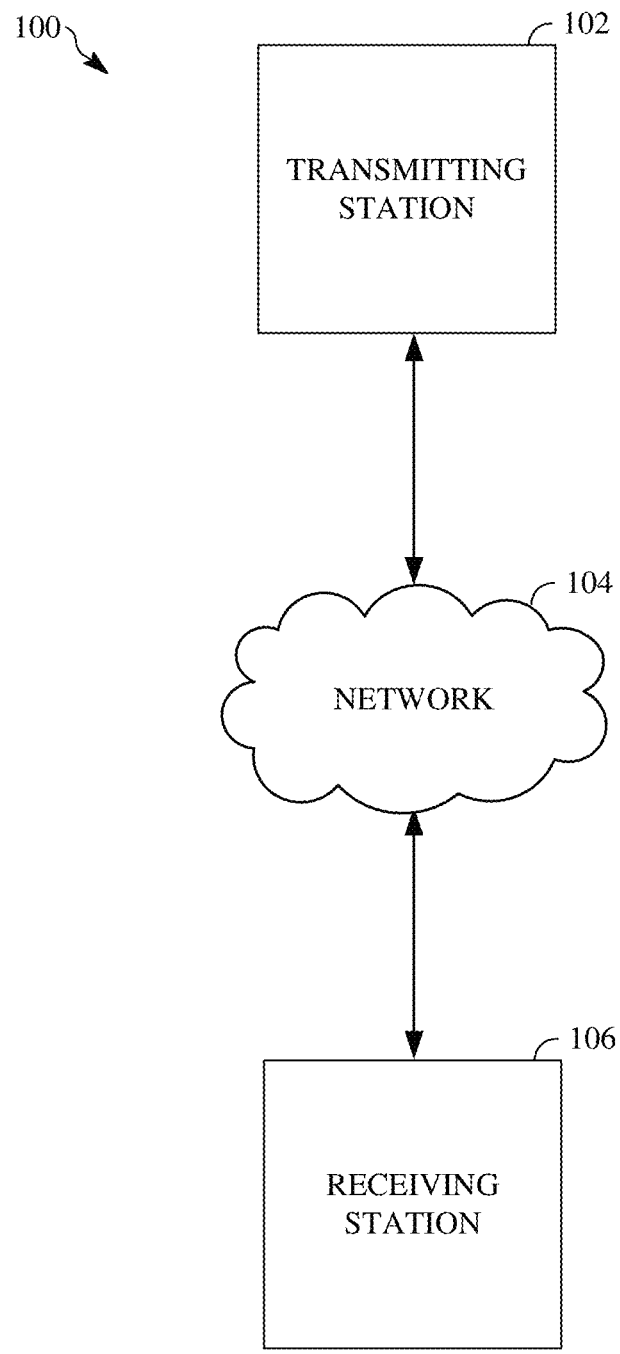
FIG. 1 is a schematic of a video encoding and decoding system.

A video stream can be compressed by a variety of techniques to reduce bandwidth required transmit or store the video stream. A video stream can be encoded into a bitstream, which involves compression, and is then transmitted to a decoder that can decode or decompress the video stream to prepare it for viewing or further processing. Compression of the video stream often exploits spatial and temporal correlation of video signals through spatial and/or motion compensated prediction.

In spatial prediction, a prediction block that resembles a current block to be encoded may be generated from values of (e.g., previously encoded and decoded) pixels peripheral to the current block. The values may be used directly to populate, or may be combined in various ways, to populate the pixel positions of a prediction block depending upon a prediction mode (also called an intra-prediction mode). By encoding the intra-prediction mode and the difference between the current block and the prediction block, a decoder receiving the encoded signal can re-create the current block.

Motion compensated prediction uses one or more motion vectors to generate the prediction block for the current block to be encoded using previously encoded and decoded pixels of another (e.g., a reference) frame. By encoding the motion vector(s), reference frame(s), and the difference between the current block and the prediction block, a decoder receiving the encoded signal can re-create the current block. Motion compensated prediction may also be referred to as inter prediction herein.

Reference frames in inter prediction can be located before or after the current frame in the sequence of the video stream, and may be frames that are reconstructed before being used as a reference frame. In some cases, there may be three or more reference frames used to encode or decode blocks of the current frame of the video sequence. One may be a frame that is referred to as a golden frame. Another may be a most recently encoded or decoded frame. Another may be an alternative reference frame that is encoded or decoded before one or more frames in a sequence, but which is displayed after those frames in an output display order or is not displayed at all. In this way, the alternative reference frame is a reference frame usable for backwards prediction. One or more forward and/or backward reference frames can be used to encode or decode a block.

In this conventional video compression technique, multiple prediction modes may be tested to determine the best prediction mode for each block to be encoded. The efficacy of a prediction mode when used to encode or decode the current block can be measured based on a resulting signal-to-noise ratio or other measures of rate-distortion. The difference block resulting from each prediction block can be further compressed by removing spatial redundancies through the use of frequency-based transforms. Accordingly, processing all of the blocks of a frame can be computationally intensive and time consuming.

An alternative approach for video compression can use texture analysis and texture synthesis, also referred to as texture analysis/synthesis coding. Areas or regions of a video frame that may be perceptually significant are considered non-texture regions, and can be coded using this or other conventional video compression techniques. In contrast, perceptually insignificant areas or regions can be classified as texture regions, and can be coded using statistical models of the pixels in the region. Perceptually insignificant regions are those within a frame that an observer is not likely to notice any difference without observing the original video sequence. For example, these areas could encompass pixels where the luma values remain relatively unchanged, and the chroma values are within defined ranges. The encoder may fit a model to those perceptually insignificant pixels in the frame and transmit the model parameters to the decoder as supplemental information. The supplemental information can be used at the decoder to identify and facilitate the reconstruction of the pixels of the texture region(s), which are then synthesized with the non-texture region(s). Generally, the model parameters may be represented by fewer bits than the pixels would be represented in conventional video compression.

The use of this texture analysis/synthesis approach can provide both enhanced coding efficiency and a reduction in computational complexity. However, identifying and synthesizing the regions are complex problems. One possible technique is to use spatial texture classification on a frame-by-frame basis. Once a region in a video frame is classified as a texture region, motion estimation may be conducted to identify homographic global motion between the current texture region and the texture region in its reference frame. The region classification information and the homographic global motion model parameters may be coded and signaled. At the decoder side, motion warping may be employed to synthesize a texture region by warping the region in the reference frame using the homographic global motion model.

This scheme may not incur visual artifacts if individual video frames are observed separately. However, synthesized regions may demonstrate artifacts across successive frames during video playback. That is, homographic global motion parameters are estimated on a per-frame basis. Accordingly, no constraint is imposed on the correlation between the global motion parameters of successive frames. The resulting motion inconsistency in the temporal dimension presents visible artifacts. This problem has prevented deployment of the described texture analysis/synthesis scheme in video compression.

Described herein are techniques that leverage machine learning to implement texture analysis/synthesis coding. A two-layer machine learning approach may be used to identify texture regions for sequential frames of a video sequence. In general, the first layer can include machine learning based spatial (two-dimensional) texture detection. The second layer can include machine learning based temporal (three-dimensional) texture detection. Further details of using learning-based motion segmentation for video compression are described herein with initial reference to a system in which the teachings herein can be implemented.

FIG. 1 is a schematic of a video encoding and decoding system 100. A transmitting station 102 can be, for example, a computer having an internal configuration of hardware such as that described in FIG. 2. However, other suitable implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102 and the encoded video stream can be decoded in the receiving station 106. The network 104 can be, for example, the Internet. The network 104 can also be a local area network (LAN), wide area network (WAN), virtual private network (VPN), cellular telephone network or any other means of transferring the video stream from the transmitting station 102 to, in this example, the receiving station 106.

Figure 2:
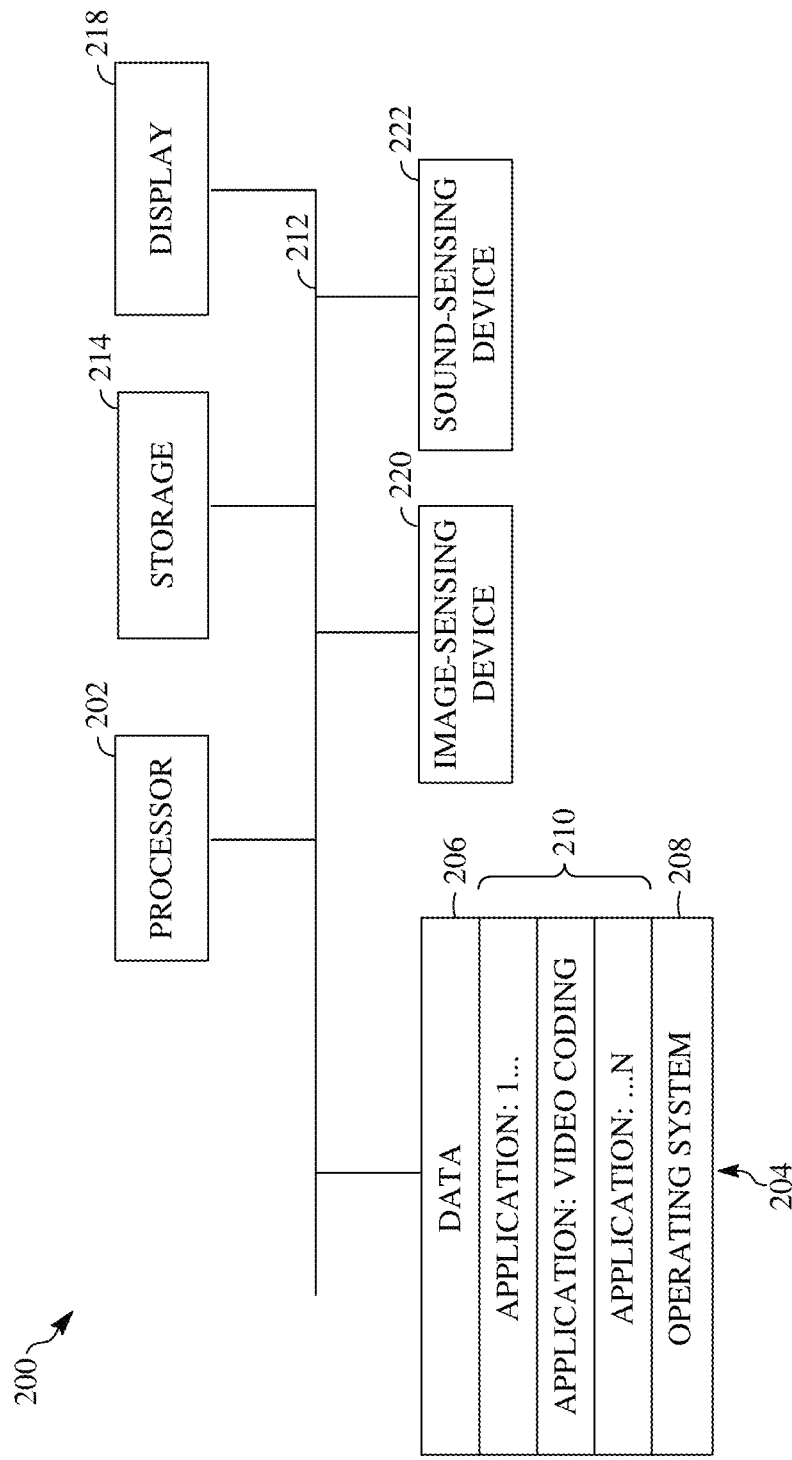
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having a non-transitory storage medium or memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used, e.g., a Hypertext Transfer Protocol (HTTP) based video streaming protocol.

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits its own video bitstream to the video conference server for decoding and viewing by other participants.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of one computing device, for example, a mobile phone, a tablet computer, a laptop computer, a notebook computer, a desktop computer, and the like.

A CPU 202 in the computing device 200 can be a central processing unit. Alternatively, the CPU 202 can be any other type of device, or multiple devices, capable of manipulating or processing information now-existing or hereafter developed. Although the disclosed implementations can be practiced with one processor as shown, e.g., the CPU 202, advantages in speed and efficiency can be achieved using more than one processor.

A memory 204 in computing device 200 can be a read only memory (ROM) device or a random access memory (RAM) device in an implementation. Any other suitable type of storage device or non-transitory storage medium can be used as the memory 204. The memory 204 can include code and data 206 that is accessed by the CPU 202 using a bus 212. The memory 204 can further include an operating system 208 and application programs 210, the application programs 210 including at least one program that permits the CPU 202 to perform the methods described here. For example, the application programs 210 can include applications 1 through N, which further include a video coding application that performs the methods described here. The computing device 200 can also include a secondary storage 214, which can, for example, be a memory card used with a mobile computing device. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the CPU 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display or light emitting diode (LED) display, such as an organic LED (OLED) display.

The computing device 200 can also include or be in communication with an image-sensing device 220, for example a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the CPU 202 and the memory 204 of the computing device 200 as being integrated into one unit, other configurations can be utilized. The operations of the CPU 202 can be distributed across multiple machines (wherein individual machines can have one or more of processors) that can be coupled directly or across a local area or other network. The memory 204 can be distributed across multiple machines such as a network-based memory or memory in multiple machines performing the operations of the computing device 200. Although depicted here as one bus, the bus 212 of the computing device 200 can be composed of multiple buses. Further, the secondary storage 214 can be directly coupled to the other components of the computing device 200 or can be accessed via a network and can comprise an integrated unit such as a memory card or multiple units such as multiple memory cards. The computing device 200 can thus be implemented in a wide variety of configurations.

Figure 3:
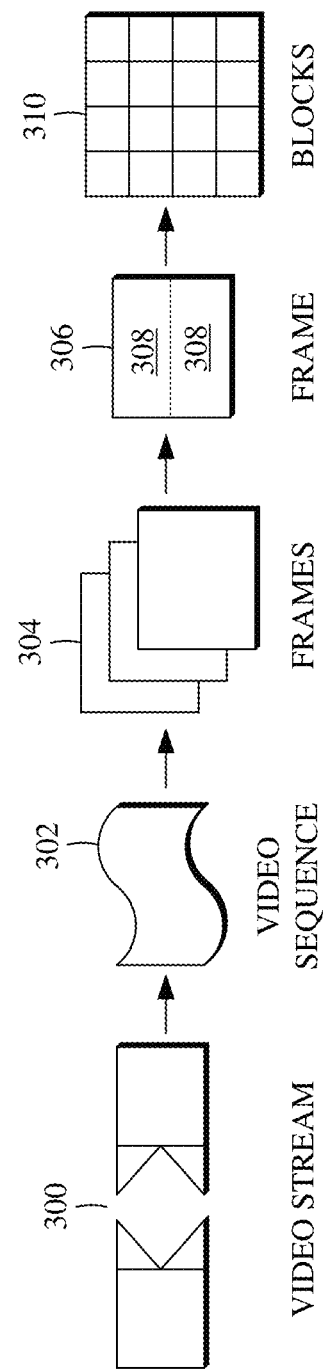
FIG. 3 is a diagram of a typical video stream to be encoded and subsequently decoded.

FIG. 3 is a diagram of an example of a video stream 300 to be encoded and subsequently decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, e.g., a frame 306. At the next level, the frame 306 can be divided into a series of planes or segments 308. The segments 308 can be subsets of frames that permit parallel processing, for example. The segments 308 can also be subsets of frames that can separate the video data into separate colors. For example, a frame 306 of color video data can include a luminance plane and two chrominance planes. The segments 308 may be sampled at different resolutions.

The segments 308 of the frame 306 may be determined as texture or non-texture regions by machine learning as described in additional detail below. As also described below, the segments 308 may processed in terms of blocks 310, which can contain data corresponding to, for example, 16×16 pixels in a segment 308. The blocks 310 can also be of any other suitable size such as 4×4 pixels, 8×8 pixels, 4×8 pixels, 8×4 pixels, 16×8 pixels, 8×16 pixels, or larger.

Figure 4:
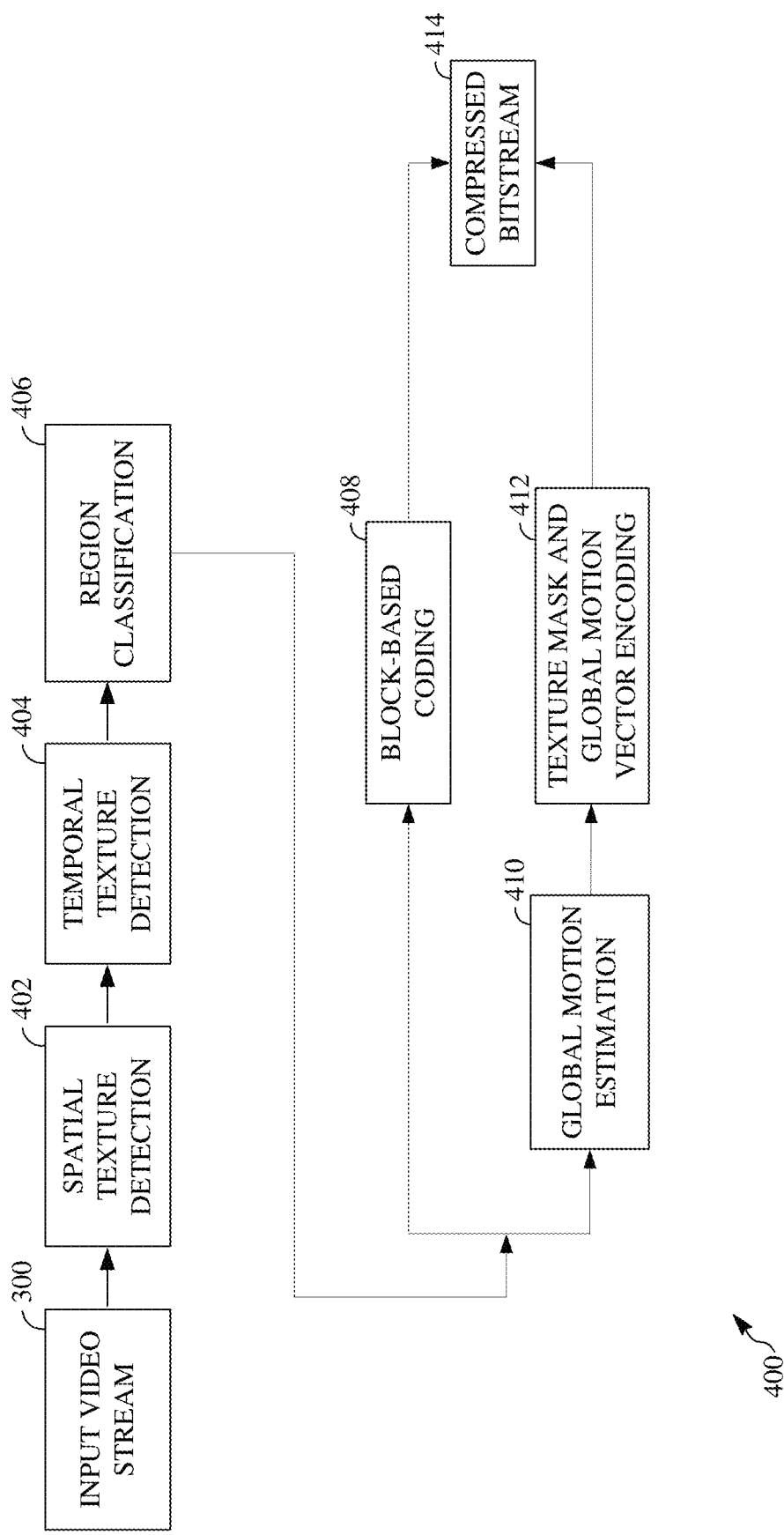
FIG. 4 is a block diagram of an encoder according to implementations of this disclosure.

FIG. 4 is a block diagram of an encoder 400 according to implementations of this disclosure. The encoder 400 can be implemented, as described above, in the transmitting station 102 such as by providing a computer software program stored in memory, for example, the memory 204. The computer software program can include machine instructions that, when executed by a processor such as the CPU 202, cause the transmitting station 102 to encode video data in the manner described in FIG. 4. The encoder 400 can also be implemented as specialized hardware included in, for example, the transmitting station 102.

The encoder 400 has various stages to produce an encoded or compressed bitstream 414 using the video stream 300 as input. The video stream 300 may comprise a large number of frames. In the techniques described herein, it is desirable to process the video stream 300 in groups of frames. The number of adjacent frames 304 in each group of frames may be fixed, or it may be determined before the processing described herein by one or more techniques that group the frames of the video stream 300 by similarity of content (e.g., up to a maximum number of frames). The groups of frames are discussed in additional detail below with regard to conventional motion-compensated prediction. In the foregoing description, eight frames form a group of frames as an example. The number of frames forming a group of frames can range from two to twenty frames, for example, and can be greater than twenty frames in some implementations.

At a spatial texture detection stage 402, and for each frame of the group of frames in a video sequence, the frame is segmented using a first classifier into a texture region and a non-texture region of an image in the frame. The non-texture region and any texture regions are non-overlapping regions or portions of the frame. In the examples described, all portions of a frame that are not assigned to a texture region are designated the non-texture region—whether or not they are contiguous.

Figures 5A, 5B:
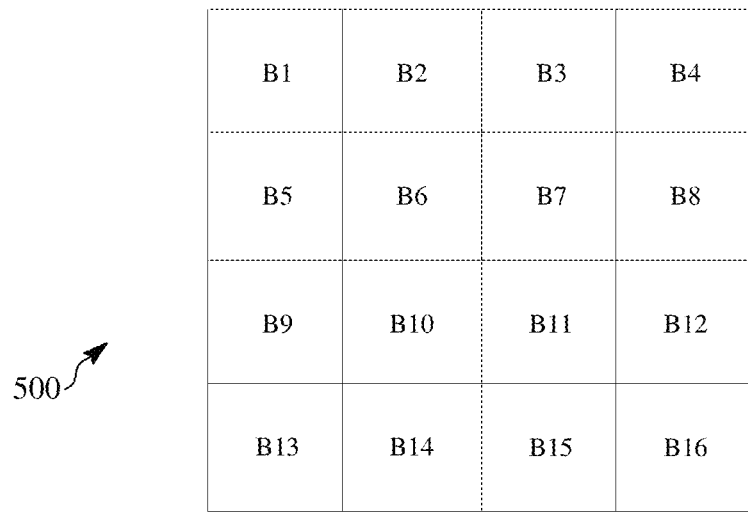
FIG. 5A is a diagram of a portion of a frame divided into blocks.
FIG. 5B is a diagram of the blocks of FIG. 5A with their assignment to either a texture region or a non-texture region.

The first classifier is generated using a first machine-learning process. Generating a classifier may also be referred to as training a classifier herein. Stated generally, the first machine-learning process uses image information from portions of frames with a known status as being assigned to a texture region or a non-texture region to train the first classifier as to what image information is indicative of a texture region and what image information is indicative of a non-texture region. For example, FIG. 5A is a diagram of a portion of a frame 500 divided into blocks B1-B16, and FIG. 5B is a diagram of the blocks B1-B16 of FIG. 5A with their assignment to either a texture region or a non-texture region. As can be seen from FIG. 5B, the blocks B1-B16 comprise training instances 1-16 for the first classifier. The column LABEL indicates the known region of each training block.

In this example, blocks B2, B3, B4, and B8 correspond to region 1, blocks B13, B14, B15, and B16 correspond to region 2, and the remaining blocks correspond to region 0. Region 0 indicates the non-texture region of the portion of the frame 500. Region 1 and region 2 are texture regions. A texture region may represent grass, a wheat field, the surface of a lake, a waterfall, the tops of trees in a forest, a clear sky, etc., in the image captured by the frame. In the example of FIGS. 5A and 5B, texture region 1 may represent a group of clouds, while texture region 2 may represent a sandy beach. Each frame of a training set of frames may have more, fewer, or different texture regions.

In the example of FIGS. 5A and 5B, the first classifier is generated so that the output distinguishes between texture regions—that is, texture regions representing different features are labeled differently. The first classifier may instead be a binary classifier that is trained using training instances where only a first value is used to indicate a texture region, regardless of type, and a second value is used to indicate a non-texture region.

The machine-learning process used for generating the first classifier can vary. In an example of the first machine-learning process, the first classifier is trained using a convolution neural network with one or more training sets of video frames. At least some of the video frames have one or more identified texture regions, where any remaining regions are respectively a non-texture region. The input into the architecture of the convolution neural network may be 32×32 color image block, or some other portion of each frame. The architecture includes convolutional layers followed by a batch normalization rectified linear unit (ReLU) and a max pooling operation. Class probabilities may be produced using three fully connected layers with dropout operations and a softmax layer. The output of the network is the probability that a block is texture or non-texture and can be thought of as a measure of the reliability of the texture/non-texture block label. The kernel size of the convolutional layer may be 3×3 and may be padded by 1. The max pooling layer may downsample the image by 2 and double the number of feature maps.

However the first classifier is generated, the first classifier may be applied to respective portions of a frame to be encoded (e.g., blocks) using pixel values of the portion as input to determine whether the portion should be assigned to a texture region or to a non-texture region. Desirably, the frame is considered in blocks having a uniform size, such as 32×32-pixel blocks. When the block represents color image data, pixel values of a block in the luma plane may be considered alone as input to the first classifier such that the corresponding chroma blocks are assigned to the region identified by the first classifier using the luma plane block pixel values. Alternatively, the luma and chroma planes of pixel data may be separately segmented. In yet another implementation, the luma and chroma pixel values may be combined for input into the first classifier. The output of the first classifier may be a first output value assigning the block to a texture region, or a second output value assigning the block to a non-texture region. In some implementations, the output of the first classifier may be a first output value assigning the block to a first texture region, a second output value assigning the block to a second texture region, or a third output value assigning the block to a non-texture region.

Once each frame of a group of frames is processed by the spatial texture detection stage 402, the results are passed to a temporal texture detection stage 404. At the temporal texture detection stage 404, the texture regions of the group of frames may be segmented using a second classifier into a texture coding region or a non-texture coding region. The second classifier uses motion across the group of frames as input and is generated using a second machine-learning process, as discussed in additional detail below.

In some implementations, the motion used by the second classifier is an optical flow. The optical flow may be estimated between adjacent frames in the group of frames. There are a number of techniques available that may be used to estimate the optical flow. A particular technique to estimate the optical flow is not required according to the teachings herein. The optical flow may be estimated only for texture regions in each frame in some implementations. The optical flow may be estimated on a pixel-by-pixel basis, block-by-block basis or region-by-region basis.

An example of a technique that can be used to calculate the optical flow on a block-by-block basis is explained with reference to FIGS. 6 and 7.

Figure 6:
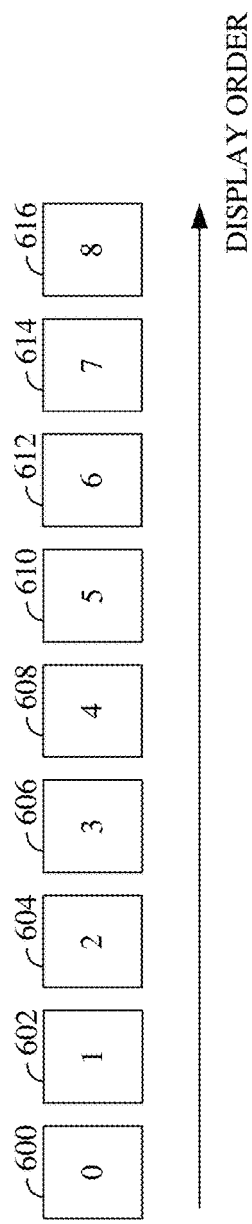
FIG. 6 is a diagram of a group of frames in a display order of a video sequence.

FIG. 6 is a diagram of a group of frames in a display order of the video sequence. In this example, the group of frames is preceded by a frame 600, which can be referred to as a key frame or an overlay frame in some cases, and comprises eight frames 602-616. No block within the frame 600 is inter predicted using a reference frame. That is, the frame 600 is an intra-predicted frame in this example, which refers to its status that predicted blocks within the frame are only predicted using intra prediction. However, the frame 600 can be an overlay frame, which is an inter-predicted frame that is a reconstructed frame of a previous group of frames. In an inter-predicted frame, at least some of the predicted blocks are predicted using inter prediction. The number of frames forming each group of frames of a video sequence can vary according to the video spatial/temporal characteristics and other encoded configurations, such as the key frame interval selected for random access or error resilience, for example.

Figure 7:
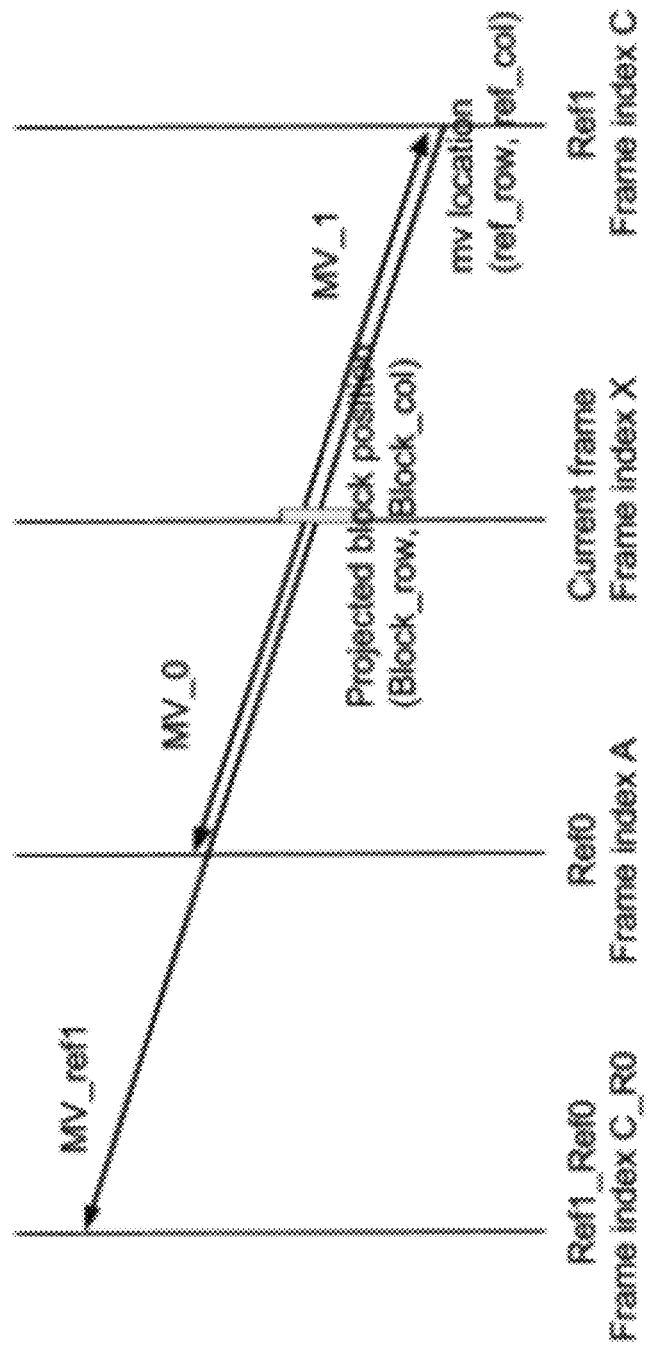
FIG. 7 is a diagram used to explain one technique of estimating an optical flow between adjacent frames.

FIG. 7 is a diagram used to explain a technique of estimating an optical flow between adjacent frames. In this example, the optical flow is assumed to be the same as the motion field for simplicity. Thus, estimating the motion field or flow between adjacent frames estimates the optical flow between adjacent frames. In other implementations, the optical flow is estimated using a technique that does not assume that the optical flow is the same as the motion field.

The motion field of the current frame (e.g., between the current frame and the next frame) may be estimated using the nearest available (e.g., reconstructed) frames before and after the current frame. In FIG. 7, the current frame has a frame index X. The motion field of the current frame includes motion vectors from the current frame towards, in this example, reference frames Ref0, Ref1, and Ref1_Ref0, or more reference frames if available. The motion vectors may be stored with regard to respective 32×32 blocks of the current frame, but different size blocks, or other portions of the current frame, may be considered, e.g., in the frame scan order. In other words, the description herein uses a 32×32 block to describe the processing, but this is an example only. The teachings may be applied to frame portions that are formed of other than blocks (such as regions) and to blocks of different sizes.

The reference frame Ref0 is a reference frame that may be used for forward prediction of the current frame, while the reference frame Ref1 is a reference frame that may be used for backward prediction of the current frame. Using the example of FIG. 6 for illustration, if the current frame is the frame 606, the immediately preceding, or last, frame 604 (e.g., the reconstructed frame stored in a reference frame buffer as a LAST_FRAME) can be used as the reference frame Ref0, while the frame 616 (e.g., the reconstructed frame stored in the reference frame buffer as an alternative reference frame ALTREF_FRAME) can be used as the reference frame Ref1.

Knowing the display indexes of the current and reference frames, motion vectors may be projected between the pixels in the reference frames Ref0 and Ref1 to the pixels in the current frame assuming that the motion field is linear in time. In the example described with regard to FIG. 6, the frame index X for the current frame is 3, the frame index A for the reference frame Ref0 is 2, and the frame index C for the reference frame Ref1 is 8. The frame index C_R0 for the reference frame Ref1_Ref0 may be 1, for example.

Linear projection may be illustrated starting with reference frame Ref1, having a frame index C. From reference frame Ref1, a motion vector MV_ref1 goes from reference frame Ref1 to the reference frame for the reference frame Ref1, namely Ref1_Ref0, whose frame index is C_R0. A motion vector contains two components, a row and column, to represent the spatial offset. Accordingly, the block located at (ref_row, ref_col) within reference frame Ref1 was predicted using the motion vector MV_ref1 and reference frame Ref1_Ref0 in this example.

This motion vector MV_ref1 is projected onto the current frame to determine where the motion trajectory fits in the current frame. The block position offset is calculated accordingly to:

$$\text{Block\_row}=\text{ref\_row}+MV\_\text{ref1.row}*(C-X)/(C-C\_R0); \text{ and}$$

$$\text{Block\_col}=\text{ref\_col}+MV\_\text{ref1.col}*(C-X)/(C-C\_R0),$$

where MV_ref1.row is a first (e.g., a vertical) component of the motion vector MV_ref1, and MV_ref1.col is a second (e.g., a horizontal) component of the motion vector MV_ref1. The projected block position within the current frame is (Block_row, Block_col).

Next, for the block position (Block_row, Block_col) in the current frame, its motion vector MV_0 may be estimated towards reference frame Ref0 according to:

$$MV\_0.\text{row}=MV\_\text{ref2.row}*(X-A)/(C-C\_R0); \text{ and}$$

$$MV\_0.\text{col}=MV\_\text{ref2.col}*(X-A)/(C-C\_R0),$$

where MV_0.row is a first (e.g., a vertical) component of the motion vector MV_0, and MV_0.col is a second (e.g., a horizontal) component of the motion vector MV_0.

Similarly, the motion vector MV_1 may be estimated towards reference frame Ref1 for the same block position (Block_row, Block_col) in the current frame according to:

$$MV\_1.\text{row}=MV\_\text{ref2.row}*(X-C)/(C-C\_R0); \text{ and}$$

$$MV\_1.\text{col}=MV\_\text{ref2.col}*(X-C)/(C-C\_R0),$$

where MV_1.row is a first (e.g., a vertical) component of the motion vector MV_1, and MV_1.col is a second (e.g., a horizontal) component of the motion vector MV_1.

The collection of motion vectors MV_0 and MV_1 for the blocks of the current frame forms an estimated motion field. In this example, either the motion vectors MV_0 or the motion vectors MV_1 may be used for the estimated optical flow for the current frame.

Referring again to FIG. 4, motion tunnels for the group of frames may be defined at the temporal texture detection stage 404 in addition to estimating the optical flow. This processing can be explained with reference to FIG. 8A.

Figure 8A:
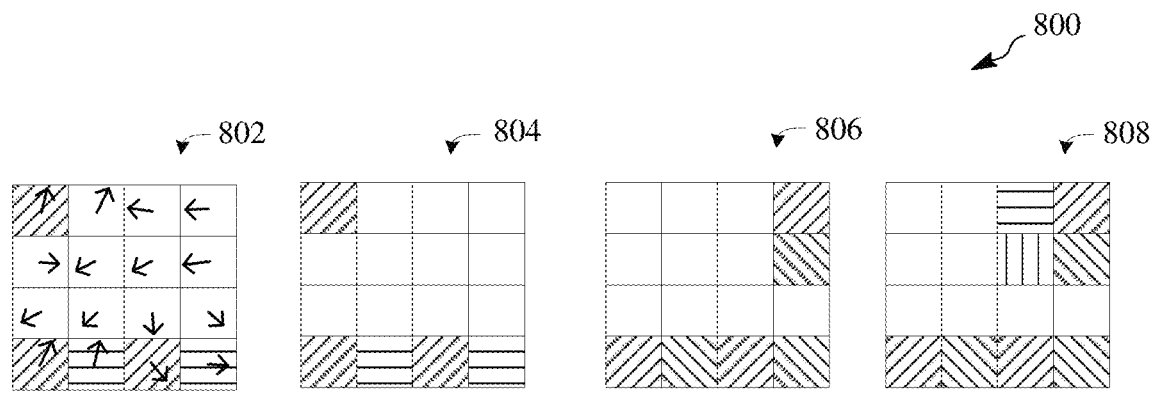
FIG. 8A is a diagram used to explain motion tunnels.

FIG. 8A shows a group of frames 800 of a video sequence formed of frames 802, 804, 806, and 808. A block having a pattern fill in a frame is classified as a texture region at the spatial texture detection stage 402. Any block with no fill in a frame is classified as a non-texture region. The optical flow is estimated between frames 802 and 804, between frames 806 and 806, and between frames 806 and 808. Arrows arranged at the center of each block in the frame 802 indicate the optical flow. Although no arrows are arranged in the remaining frames 804, 806, and 808 for clarity, these frames also have an optical flow for each block. In this example, as in the example above, the optical flow is produced for a block as a whole. Therefore, the same optical flow is imputed to each pixel of the block. This is not a requirement, and the optical flow per pixel may instead be estimated.

A motion tunnel includes a series of frame portions from respective frames of the group of frames in the video sequence. A motion tunnel may be formed by co-located blocks in each frame of the group of frames in some implementations. A motion tunnel may be formed of groups of blocks within a first frame of the group of frames and co-located blocks in the remaining group of frames. In the example of FIG. 8A, sixteen motion tunnels are preliminarily determined using respective co-located blocks in each frame of the group of frames 800. The blocks may be referred to in raster scan order as blocks 0-15.

The second classifier may use the motion tunnels for segmentation in three dimensions—two-dimensional spatial coordinates and a temporal dimension. The second classifier is generated using a second machine-learning process. Stated generally, the second machine-learning process uses image and motion information from groups of frames with known portions of frames assigned to a texture region with a known status as demonstrating or as not demonstrating visible (e.g., vibration) artifacts across successive frames to train the second classifier as to what image and motion information is indicative of a texture region that can be encoded using a homographic global motion model without artifacts and what image and motion information is indicative of a texture region that cannot be encoded using a homographic global motion model without artifacts. A texture region that can be encoded using a homographic global motion model without artifacts may be referred to as a texture coding region, while a texture region that cannot be encoded using a homographic global motion model without artifacts may be referred to as a non-texture coding region. The second classifier may trained as a binary classifier that outputs a first value when it is applied to image and motion information for a group of frames that exhibit the motion-tolerant properties of a texture coding region and outputs a second value when it is applied to image and motion information for a group of frames that more consistent with the properties of a non-texture coding region.

The machine-learning process used for generating the second classifier can vary. The second machine-learning process, in a similar manner to the first machine-learning process above, may train the second classifier using a convolution neural network with one or more training sets of video frames. Alternatively, a different machine-learning process may be used. In either implementation, training may limited to one or more identified texture regions that span an entire video sequence of a group of frames. Training may be performed on a per-region (or per-feature), pixel-wise basis. Image information used by the second classifier may be the same as that used by the first classifier (e.g., pixel color information). The positions of the pixels within each frame and the motion information (e.g., the optical flow) for the pixels may be used for the training. In some implementations, the positions of the pixels (and not the color information) is the only image information used with the motion information for training the second classifier.

However the second classifier is generated, the second classifier may be applied to respective motion tunnels of a frame to be encoded to determine whether blocks forming the motion tunnel that belong to a texture region should be assigned to a texture coding region or to a non-texture coding region. In some implementations, the motion tunnels preliminarily determined may be modified before the second classifier is applied. Modification of the motion tunnels can include omitting from further analysis any motion tunnel that includes no texture regions.

Modification of the motion tunnels can include limiting the motion tunnel to only adjacent texture regions. For example, using the block labeling scheme of FIG. 5A for the blocks of FIG. 8A, the block B1 in the frame 802 forms a motion tunnel with the blocks B1 of the frames 804, 806, and 808. However, the blocks B1 in the frames 806 and 808 are not texture regions. Accordingly, this motion tunnel may be limited to the blocks B1 in the frames 802 and 804. Similarly, the motion tunnel formed by the blocks B4 in the frames 802-808 may be modified by removing the blocks B4 in the frames 802 and 804 from the motion tunnel.

Modification of the motion tunnels can include omitting from further analysis any motion tunnel that includes a texture region in a frame of the group of frames that is not preceded or followed by another texture region. Again referring to FIGS. 5A and 8A, the blocks B3 and B7 in the frame 808 are not respectively preceded by texture regions in the frame 806, and no frame follows the frame 808 in the group of frames. As mentioned above, the teachings herein are particularly useful for addressing artifacts in the reconstruction of texture regions caused by motion. A texture region that is not preceded by or followed by a frame of the group of frames having a co-located texture region can be classified as a texture coding region without application of the second classifier. Alternatively, a texture region that is not preceded by or followed by a frame of the group of frames having a co-located texture region can be classified as a non-texture coding region without application of the second classifier.

If all of these modifications are implemented, seven motion tunnels of the group of frames 800 are analyzed at the temporal texture detection stage 404. The motion tunnels comprise the blocks B1 in each of the frames 802 and 804, the blocks B4 in each of the frames 806 and 808, the blocks B8 in each of the frames 806 and 808, the blocks B13 in each of the frames 802-808, the blocks B14 in each of the frames 802-808, the blocks B15 in each of the frames 802-808, and the blocks B16 in each of the frames 802-808.

In some implementations, the output of the second classifier may be a first output value assigning the motion tunnel to a texture coding region or a second output value assigning the motion tunnel to a non-texture coding region. Assigning the motion tunnel to a texture coding region can include assigning all of the blocks that form the motion tunnel to the texture coding region. Assigning the motion tunnel to a texture coding region can include assigning only those blocks that form a texture region to the texture coding region, while any other blocks of the motion tunnel are already classified as non-texture regions. Assigning the motion tunnel to a non-texture coding region can include assigning all of the blocks that form the motion tunnel to the non-texture coding region. Assigning the motion tunnel to a non-texture coding region can include assigning only those blocks that form a texture region to the non-texture coding region, while any other blocks of the motion tunnel are already classified as non-texture regions.

The simplified example of FIG. 8A describes only translational motion. However, the optical flow estimation may result in other motion, such as zoom in, zoom out, sheer, etc.

According to the foregoing description, a motion tunnel can be established by tracking patterns of optical flow and connecting regions across successive frames that follow the same motion pattern within a group of frames. For instance, connected regions may all present certain translational motion with certain parameters that vary smoothly across successive frames.

Returning again to FIG. 4, the output of the second classifier at the temporal texture detection stage 404 passes to a region classification stage 406. The region classification stage 406 identifies one or more texture region masks for the current group of frames. The texture region masks are defined for continuous regions for the entire block of frames. For example, contiguous texture coding regions in a frame can define a texture region mask for the frame and any following frames that include a corresponding texture coding region. A texture region mask may be defined that indicates pixel locations of the texture coding region.

Figure 8B:
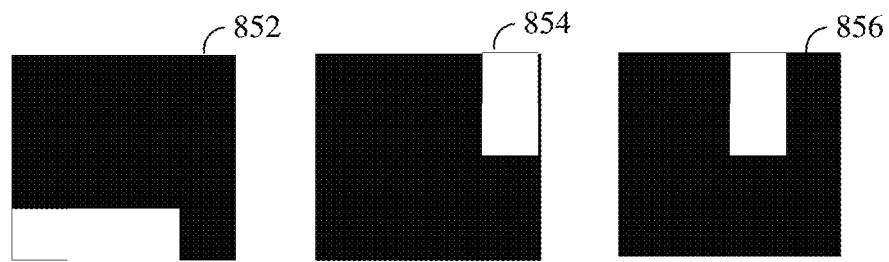
FIG. 8B is a diagram showing texture region masks for the group of frames of FIG. 8A

FIG. 8B is a diagram showing texture region masks for the group of frames of FIG. 8A. In this example, the second classifier has classified the motion tunnel comprising the blocks B1 in each of the frames 802 and 804 as a non-texture coding region, the motion tunnel comprising the blocks B4 in each of the frames 806 and 808 as a texture coding region, the motion tunnel comprising the blocks B8 in each of the frames 806 and 808 as a texture coding region, the motion tunnel comprising the blocks B13 in each of the frames 802-808 as a texture coding region, the motion tunnel comprising the blocks B14 in each of the frames 802-808 as a texture coding region, the motion tunnel comprising the blocks B15 in each of the frames 802-808 as a texture coding region, and the motion tunnel comprising the blocks B16 in each of the frames 802-808 as a non-texture coding region. The blocks B3 and B7 in the frame 808 are classified as a texture coding region without using the second classifier.

The region classification stage 406 produces a texture region mask 852 that identifies a texture coding region in each of the frames 802-808, produces a texture region mask 854 that identifies a texture coding region in each of the frames 806 and 808, and produces a texture region mask 856 that identifies a texture coding region in the frame 808. While the texture region masks in FIG. 8B are shown as regions within a frame, the texture region masks may comprise a list of dimensions of respective texture coding regions and their locations.

The texture region maps produced at the region classification stage 406 are used in the encoding process of a current frame of the group of frames. More specifically, the current frame can be encoded by encoding blocks of a non-texture coding region of the current frame using a conventional block-based encoding process, and encoding blocks of a texture coding region of the current frame using other than the conventional block-based encoding process. For example, the current frame can be encoded by encoding blocks of the non-texture coding region at the block-based coding stage 408, and encoding blocks of the texture coding region of the current frame using other than the block-based coding technique. The coding technique may include an analysis/synthesis coding technique described an additional detail below with reference to the global motion estimation stage 410 and the texture mask and global motion vector encoding stage 412. Processing at the block-based coding stage 408, and at the global motion estimation stage 410 and the texture mask and global motion vector encoding stage 412 may be performed on a per-frame basis to produce a compressed bitstream 414.

It is worth noting that the texture region masks 852, 854, and 856 do not separately identify the non-texture region or the non-texture coding region. The non-texture region and the non-texture coding region may both be encoded using the block-based coding technique at the block-based coding stage 408. The blocks encoded at the block-based coding stage 408 may be encoded in raster scan order.

The block-based coding technique used at the block-based coding stage 408 may use a one-stage or a two-stage encoder. In an implementation of the block-based coding stage 408, respective blocks can be encoded using intra-frame prediction (also called intra-prediction) or inter-frame prediction (also called inter-prediction). In either case, a prediction block can be formed. In the case of intra-prediction, a prediction block may be formed from samples in the current frame that have been previously encoded and reconstructed. In the case of inter-prediction, a prediction block may be formed from samples in one or more previously constructed reference frames. Next, the prediction block can be subtracted from the current block to produce a residual block (also called a residual). One or more block-based transforms may be used to transform the residual into transform coefficients in, for example, the frequency domain. Optional quantization converts the transform coefficients into discrete quantum values, which are referred to as quantized transform coefficients, using a quantizer value or a quantization level. For example, the transform coefficients may be divided by the quantizer value and truncated. The quantized transform coefficients are then entropy encoded for inclusion in the compressed bitstream 414, together with other information used to decode the block, which may include for example the type of prediction used, transform type, motion vectors and quantizer value.

Other variations of a block-based encoder other than the transform-based encoder described above are also possible. For example, a non-transform based encoder can quantize the residual signal directly without transforms.

In contrast to the block-based encoding described above, blocks of a texture coding region in the current frame may be encoded using other than the block-based coding technique. The texture coding region may be encoded as a region, instead of on a block-by-block basis. For example, at the global motion estimation stage 410, motion estimation may be performed to identify homographic global motion between the current texture region and the texture region in a reference frame of the current frame. The motion estimation used may be any known motion estimation technique. One example of identifying homographic global motion and forming a homographic global motion model may be found in Bosch et al., "Segmentation-Based Video Compression Using Texture and Motion Models," IEEE Journal of Selected Topics in Signal Processing, Vol. 5, No. 7, November 2011, pp. 1366-1377 (hereinafter Bosch), which is incorporated herein in its entirety by reference.

In some implementations, the first frame in a group of frames is intra-predicted. Accordingly, the first frame does not have any reference frames, regardless of the designation of blocks as belonging to a texture coding region, a non-texture coding region, or a non-texture region. Accordingly, homographic global motion may be determined only for subsequent frames of the group of frames, e.g., using the last frame and/or the alternative reference frame as a reference frame.

Region classification information and homographic global motion model parameters are coded at the texture mask and global motion vector encoding stage 412, and are added to the compressed bitstream 414. The region classification information may comprise the texture region map for the current frame, which identifies the texture coding region of the current frame. In some implementations the texture region map is encoded only once, e.g., with identification of the frames of the group of frames with which it is used. The homographic global motion model parameters represent the homographic global motion identified at the global motion estimation stage 410.

The compressed bitstream 414 can be formatted using various techniques, such as variable length coding (VLC) or arithmetic coding. The compressed bitstream 414 can also be referred to as an encoded video stream or encoded video bitstream, and the terms will be used interchangeably herein.

Figure 9:
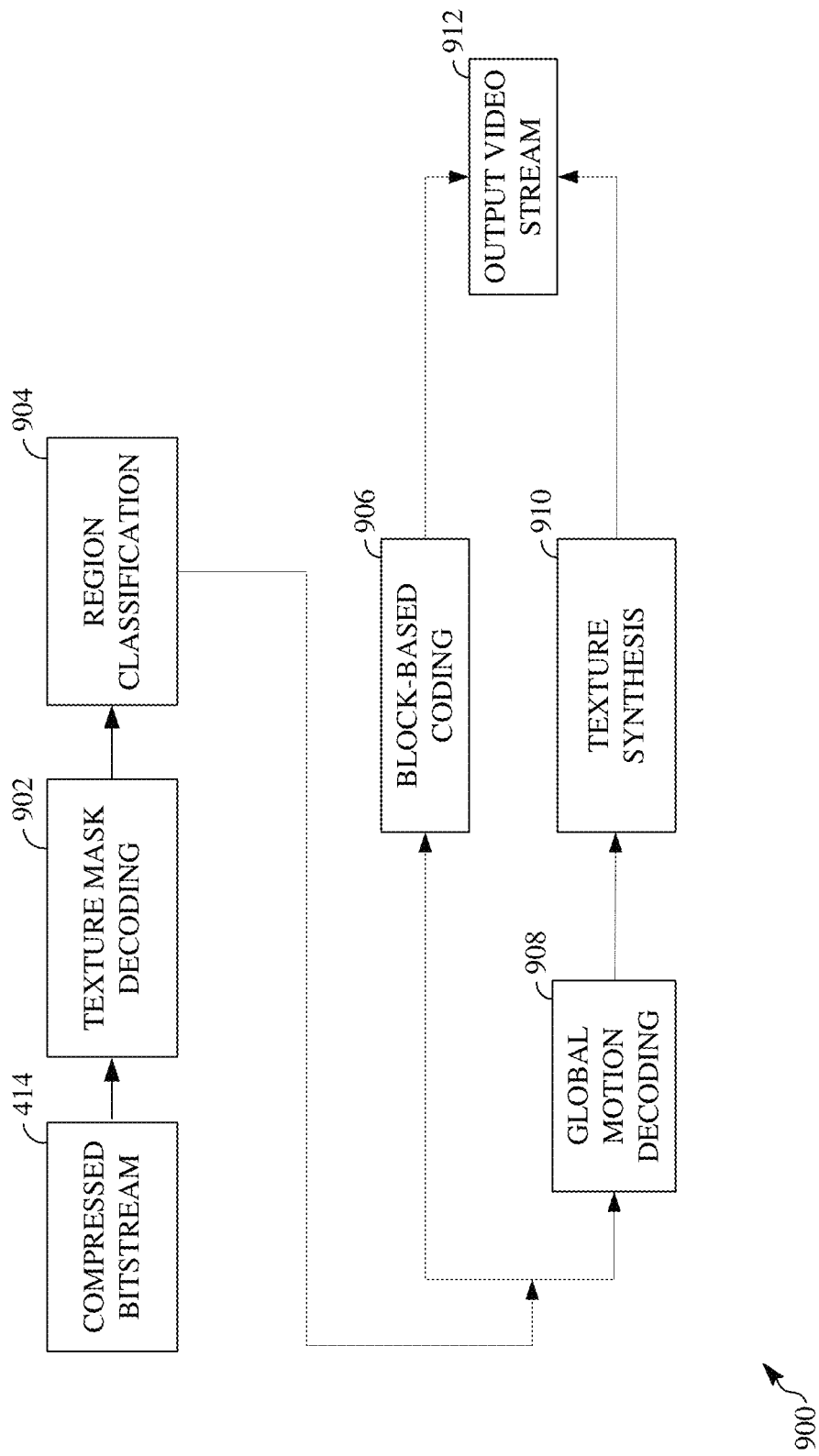
FIG. 9 is a block diagram of a decoder according to implementations of this disclosure.

FIG. 9 is a block diagram of a decoder 900 according to implementations of this disclosure. The decoder 900 can be implemented in the receiving station 106, for example, by providing a computer software program stored in the memory 204. The computer software program can include machine instructions that, when executed by a processor such as the CPU 202, cause the receiving station 106 to decode video data in the manner described in FIG. 9. The decoder 900 can also be implemented in hardware included in, for example, the transmitting station 102 and/or the receiving station 106.

When the compressed bitstream 414 is presented for decoding, header information for the current frame of the group of frames can be decoded by, e.g., entropy decoding. At a texture mask decoding stage 902, the texture region mask for the current frame of the group of frames may be decoded. In some implementations, identifiers for more than one frame with which the texture region mask is used are also decoded at the texture mask decoding stage 902. At the region classification stage 904, the texture coding region is identified using the texture region mask for the current frame.

Desirably, the blocks forming the non-texture coding region and the non-texture region are decoded at the block-based coding stage 906 before decoding the texture coding region. More specifically, the data elements within the compressed bitstream 414 can be decoded by entropy decoding to produce a set of quantized transform coefficients. The quantized transform coefficients may then be dequantized (e.g., by multiplying the quantized transform coefficients by the quantizer value), and the dequantized transform coefficients are inverse transformed to produce a derivative residual. Using header information decoded from the compressed bitstream 414, e.g., on a block basis, the decoder 900 can perform intra-prediction and/or inter-prediction to create the same prediction block as was created in the encoder 400. The prediction block can be added to the derivative residual to create a reconstructed block. One or more post-filtering stages may be used to reduce blocking artifacts, etc. Other variations of a block-based decoder may be used.

Before the decoded blocks are included in an output video stream 912, the texture coding region is decoded and incorporated into the decoded blocks to form a frame. At a global motion decoding stage 908, the homographic global motion model parameters are decoded. The homographic global motion model parameters are used at the texture synthesis stage 910 to synthesize the texture coding region using motion warping. More specifically, a texture region in the reference frame is warped using the homographic global motion model to synthesize the texture region in the current frame. Any motion warping technique may be used that warps the pixels of the texture region in the reference frame to the pixels of the texture region in the current frame using the motion model parameters.

The synthesized texture region is added to the indicated area in the texture region mask to generate a decoded frame for inclusion in the output video stream 912. The output video stream 912 can also be referred to as a decoded video stream, and the terms will be used interchangeably herein.

For simplicity of explanation, the encoding and decoding processes are described as a series of steps or operations. However, the steps or operations in accordance with this disclosure can occur in various orders and/or concurrently. Additionally, other steps or operations not presented and described herein may be used. Furthermore, not all illustrated steps or operations may be required to implement a method in accordance with the disclosed subject matter.

The aspects of encoding and decoding described above illustrate some examples of encoding and decoding techniques. However, it is to be understood that encoding and decoding, as those terms are used in the claims, could mean compression, decompression, transformation, or any other processing or change of data.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of the transmitting station 102 and/or the receiving station 106 (and the algorithms, methods, instructions, etc., stored thereon and/or executed thereby, including by the encoder 400 and the decoder 900) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of the transmitting station 102 and the receiving station 106 do not necessarily have to be implemented in the same manner.

Further, in one aspect, for example, the transmitting station 102 or the receiving station 106 can be implemented using a general purpose computer or general purpose processor with a computer program that, when executed, carries out any of the respective methods, algorithms and/or instructions described herein. In addition, or alternatively, for example, a special purpose computer/processor can be utilized that contains other hardware for carrying out any of the methods, algorithms, or instructions described herein.

The transmitting station 102 and the receiving station 106 can, for example, be implemented on computers in a video conferencing system. Alternatively, the transmitting station 102 can be implemented on a server and the receiving station 106 can be implemented on a device separate from the server, such as a hand-held communications device. In this instance, the transmitting station 102 can encode content using an encoder 400 into an encoded video signal and transmit the encoded video signal to the communications device. In turn, the communications device can then decode the encoded video signal using a decoder 900. Alternatively, the communications device can decode content stored locally on the communications device, for example, content that was not transmitted by the transmitting station 102. Other suitable transmitting and receiving implementation schemes are available. For example, the receiving station 106 can be a generally stationary personal computer rather than a portable communications device and/or a device including an encoder 400 may also include a decoder 900.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. An apparatus, comprising:
a non-transitory memory; and
a processor configured to execute instructions stored in the non-transitory memory to:
for each frame of a group of frames in a video sequence, segment the frame using a first classifier into at least one of a texture region or a non-texture region of an image in the frame, the first classifier generated using a first machine-learning process;
estimate an optical flow between adjacent frames in the group of frames;
define motion tunnels for the group of frames, a motion tunnel of the motion tunnels comprising a series of frame portions from adjacent frames of the group of frames in the video sequence;
segment the texture regions of the group of frames using a second classifier into a texture coding region or a non-texture coding region, the second classifier using motion across the group of frames and generated using a second machine-learning process, wherein the instructions to segment the texture regions comprise instructions to:
for a motion tunnel of the motion tunnels including a texture region, classify the motion tunnel using the second classifier into the texture coding region or the non-texture coding region using the optical flow; and
encode a current frame of the group of frames in the video sequence by:
encoding blocks of the non-texture coding region of the current frame using a block-based coding technique; and
encoding blocks of the texture coding region of the current frame using other than the block-based coding technique.

2. The apparatus of claim 1, wherein the instructions to classify the motion tunnel comprise instructions to:
extract values from the series of frame portions of the motion tunnel; and
apply the second classifier to the motion tunnel using the values as input, the second classifier having an output value assigning the motion tunnel to the texture coding region or to the non-texture coding region.

3. The apparatus of claim 1, wherein the instructions to encode the current frame comprises instructions to:
encode blocks of the non-texture region of the current frame using the block-based coding technique.

4. The apparatus of claim 1, wherein:
the instructions further comprise instructions to perform a global motion estimation for the texture coding region to obtain a homographic global motion model; and
the instructions to encode the texture coding region comprise instructions to encode the texture coding region using the homographic global motion model.

5. The apparatus of claim 1, wherein the instructions to segment the frame comprise instructions to, for multiple blocks of the frame, apply the first classifier to a block of the multiple blocks using pixel values of the block as input, the first classifier having an output value assigning the block to the texture region or to the non-texture region.

6. The apparatus of claim 5, wherein a first value output from the first classifier assigns the block to the texture region and a second value output from the first classifier assigns the block to the non-texture region.

7. The apparatus of claim 1, wherein:
the texture region of each of at least two adjacent frames of the group of frames includes a first texture region and a second texture region,
the instructions to segment the frames comprise instructions to, for multiple blocks in each of the at least two adjacent frames:
apply the first classifier to the block using pixel values from the block as input, the first classifier having a first output value assigning the block to the first texture region, a second output value assigning the block to a second texture region, or a third output value assigning the block to the non-texture region; and
the first texture region, the second texture region, and the non-texture region are non-overlapping regions of a respective frame of each of the at least two adjacent frames.

8. The apparatus of claim 1, wherein the instructions further comprise instructions to:
define a texture region mask that indicates pixel locations of the texture coding region in a frame of the group of frames in which the texture coding region first appears in the video sequence; and
encode the texture region mask.

9. The apparatus of claim 1, wherein the instructions further comprise instructions to:
   train the first classifier using a convolution neural network.

10. The apparatus of claim 1, wherein the first classifier is a binary classifier and the second classifier is a binary classifier.

11. An apparatus, comprising:
   a processor configured to:
   select a current frame of a group of frames in a video sequence, the current frame encoded by:
      for each frame of a group of frames in a video sequence, segmenting blocks of the frame using a first classifier into a texture region or a non-texture region of an image in the frame, the first classifier generated using a first machine-learning process;
      estimate an optical flow between temporally-adjacent frames in the group of frames;
      establish motion tunnels of the group of frames, respective motion tunnels of the motion tunnels established by connecting regions across the group of frames sharing a motion pattern according to the optical flow;
      assigning a motion tunnel of the group of frames using a second classifier into a texture coding region or a non-texture coding region, wherein the second classifier is generated using a second machine-learning process, the motion tunnel includes a texture region of at least one of the group of frames, assigning the motion tunnel into a texture coding region comprises assigning all blocks that form the motion tunnel to the texture coding region, and assigning the motion tunnel into a non-texture coding region comprises assigning all blocks that form the motion tunnel to the non-texture coding region;
      encoding blocks of the non-texture coding region of the current frame using the block-based coding technique; and
      encoding blocks of the texture coding region of the current frame using other than the block-based coding technique;
   decode the blocks of the non-texture coding region of the current frame using the block-based coding technique; and
   decode the blocks of the texture coding region using the other than the block-based coding technique.

12. The apparatus of claim 11, wherein the processor is configured to:
   determine a texture region mask for the current frame, wherein the texture region mask indicates which blocks of the current frame are in the texture coding region.

13. The apparatus of claim 11, wherein to decode the blocks of the texture coding region comprise to:
   decode parameters of a homographic global motion model for the texture coding region; and
   synthesize the texture coding region in the current frame by warping a texture coding region in a reference frame using the homographic global motion model.

14. The apparatus of claim 11, wherein to decode the blocks of the non-texture coding region comprises to:
   decode quantized transform coefficients of a current block of the non-texture coding region to generate a residual;
   at least one of inter-predict or intra-predict the current block of the non-texture coding region to generate a prediction block; and
   generate the current block by adding the prediction block to the residual.

15. The apparatus of claim 11, wherein to decode the blocks of the non-texture coding region comprises to decode the blocks of the non-texture coding region before decoding the blocks of the texture coding region.

16. A method, comprising:
   selecting a current frame of a group of frames in a video sequence, the current frame encoded by:
      for each frame of a group of frames in a video sequence, segmenting the frame using a first classifier into at least one of a texture region or a non-texture region of an image in the frame, the first classifier generated using a first machine-learning process;
      segmenting the texture regions of the group of frames using a second classifier into a texture coding region or a non-texture coding region, the second classifier using motion across the group of frames as input and generated using a second machine-learning process, wherein the motion across the group of frames comprises motion between temporally-adjacent frames in the group of frames, and segmenting the texture regions of the group of frames comprises:
         establishing motion tunnels of the group of frames, respective motion tunnels of the motion tunnels established by connecting regions across the group of frames sharing a motion pattern, wherein at least some of the motion tunnels include a texture region of the texture regions; and
         assigning each motion tunnel of the group of frames using the second classifier into a texture coding region or a non-texture coding region using the second classifier;
      encoding blocks of the non-texture region of the current frame using a block-based coding technique;
      encoding blocks of the non-texture coding region of the current frame using the block-based coding technique; and
      encoding blocks of the texture coding region of the current frame using other than the block-based coding technique; and
   decoding the blocks of the texture coding region using the other than the block-based coding technique after decoding all other blocks of the current frame.

17. The method of claim 16, further comprising:
   decoding a texture region mask for the current frame that identifies the blocks of the texture coding region of the current frame.

18. The method of claim 16, further comprising:
   decoding all other blocks of the current frame in raster scan order using the block-based coding technique before decoding the blocks of the texture coding region.

19. The method of claim 16, further comprising:
   determining a homographic global motion model for the texture coding region from an encoded bitstream;
   determining a reference frame for the current frame; and
   decoding the blocks of the texture coding region by synthesizing the texture coding region by warping a reference texture coding region in the reference frame using the homographic global motion model.

* * * * *